United States Patent Office 3,369,028
Patented Feb. 13, 1968

3,369,028
HERBICIDAL BENZIMIDAZOLE
Karl-Heinz Büchel, Hangelar, Germany, assignor to Shell Oil Company, New York, N.Y., a corporation of Delaware
No Drawing. Filed Aug. 3, 1966, Ser. No. 569,799
Claims priority, application Germany, Aug. 6, 1965, S 98,709
1 Claim. (Cl. 260—309.2)

This invention relates to 2-methylthio-5,6-dichlorobenzimidazole, a novel compound of substantial value as a herbicide, particularly as a post-emergence herbicide.

The compound of the invention was prepared as follows ("parts" means parts by weight unless otherwise indicated, with parts by weight bearing the same relationship to parts by volume as does the kilogram to the liter):

9.6 parts of potassium hydroxide was dissolved in 150 parts by volume of ethanol (95%) and 30 parts by volume of water, then 13.5 parts of carbon disulfide was slowly added, with stirring. This solution was added dropwise at boiling temperature to a solution of 30 parts of 3,4-dichloro-o-phenylene diamine in 300 parts by volume of ethanol. After a reaction time of 6 hours the alcohol was evaporated and the dark-brown residue was dissolved in water. The free mercapto compound was precipitated by adding 25 parts by volume of glacial acetic acid. After recrystallization from acetic acid, a yellowish solid substance was obtained having a melting point of 355° C.

Yield: 28 parts (76% of theory) of 5,6-dichloro-2-mercaptobenzimidazole.

A quantity of 5.5 parts of the 5,6-dichloro-2-mercaptobenzimidazole was dissolved with 1.1 parts of sodium hydroxide in 150 parts by volume of ethanol and heated to boiling temperature. A quantity of 4.3 parts of methyl iodide was added dropwise to the yellow-colored boiling solution and heating was continued for 1 hour. The still hot solution was poured into 300 parts by volume of hot water having a temperature of approximately 70° C. and allowed to cool. During cooling white needles of 5,6-dichloro-2-methylthiobenzimidazole separated off. Melting point 237° C. Yield: 6 parts (92% of theory).

Analysis (by weight) for $C_8H_6Cl_2N_2S$ (molecular weight 233.1). Calculated: C, 41.3; H, 2.6; N, 12.1. Found: C, 41.3; H, 2.8; N, 12.5.

The herbicidal activity of the compound of the invention was tested before the germination (pre-sowing treatment) of seeds of watergrass (*Echinochloa crusgalli*) and garden cress (*Lepidium sativum*). To this end the seeds were placed in the soil which had been treated with the substances at 1.13 and 11.3 kilograms per hectare and kept under uniform conditions of temperature, humidity and light for 11 days. Subsequently the herbicidal effect was evaluated, 0 representing no activity, and 9 complete kill. The results are shown in Table I.

The herbicidal activity after germination (post-emergence treatment) was tested by spraying diluted suspensions of the compounds in 1:1 mixtures of acetone and water containing ½% of a wetting agent on seedlings of pigweed (Amaranthus sp.) and crabgrass (*Digitaria sanguinalis*) under controlled conditions. The results were avaluated after 11 days and are shown in Table I.

TABLE I

| Application before germination | | | | Application after germination | | | |
|---|---|---|---|---|---|---|---|
| Echinochloa | | Lepidium | | Digitaria | | Amaranthus | |
| Dosage [1] | | | | Dosage | | | |
| 1.13 | 11.3 | 1.13 | 11.3 | 1.13 | 11.3 | 1.13 | 11.3 |
| 0 | 0 | 1 | 7 | 9 | 9 | 6 | 8 |

[1] Kilograms per hectare.

For the purpose of determining the herbicidal activity before germination, jars of seed-containing, freshly cultivated soil were treated by means of a logarithmic spraying device with two substances to be tested. The seeds of the following test plants had been worked into the soil: Italian ryegrass (*Lolium multiflorum*), brome grass (*Bromus tectorum*), crabgrass (*Digitaria sanguinalis*), curled dock (*Rumex crispus*), pigweed (Amaranthus sp.), and charlock (*Brassica arvensis*). Four weeks after spraying the test was evaluated by comparing with an untreated area. The quantity ($LD_{95}$) of substance to be tested was determined at which 95% of the weeds had been killed. The results are shown in Table II.

TABLE II.—$LD_{95}$ IN KILOGRAMS/HECTARE

| Lolium | Bromus | Digitaria | Rumex | Amaranthus | Brassica |
|---|---|---|---|---|---|
| >11.3 | 10.1 | 7.9 | 8.5 | 9.6 | 7.6 |

In field tests the herbicidal activity of 5,6 - dichloro-2 - methylthiobenzimidazole was ascertained in post-emergence treatments. The following results ($LD_{95}$ in kilograms/hectare) were obtained for: Italian ryegrass (Lolium m.)—>2.2; watergass (*Echinochloa crusgalli*)—1.9; pigweed (Amaranthus sp.)—0.7; *Amsinckia douglasiana*—2.1; round-leaved mallow (*Malva borealis*)—1.9; deadnettle (*Lamium*)—1.2; lucerne (*Medicago sativa*)—1.5.

The benzimidazole of this invention is soluble in the common organic horticultural solvents. Thus, according to the intended method of application, the character of the plants involved, and the concentration of herbicide to be used, the benzimidazole can be formulated as a solution or suspension in water, or a suitable nonphytotoxic organic solvent, as a dispersion or emulsion of the active agent in a non-solvent therefor, as an emulsion of a solution of the active agent in a suitable solvent emulsified with a second, inhomogeneous liquid, or as a solid comprising the active agent or agents sorbed on a sorptive solid carrier. Where a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, oils of animal or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

A solution of the benzimidazole may be applied as such to the plants or to the soil that is to be treated, or it may be suspended in water and the suspension or emulsion applied to the plants or soil. Thus, a relatively concentrated solution of the benzimidazole in a water-immiscible solvent may be prepared, with added emulsifying, dispersing or other surface-active agents, and the concentrate diluted in the spray tank with water to form a uniform fine emulsion which can be applied by conventional spray devices. An emulsion or dispersion of the benzimidazole as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts, for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example Triton X–100 and Lissapol N—believed to be condensation products of alkylphenols with ethylene oxide—and Tweens—believed to be condensation products of ethylene oxide and higher fatty acid esters, for example, oleic acid ester of anhydrosorbitols.

Liquid compositions of these herbicidal benzimidazoles suitable for application to plants or to their environment contain the active agent or agents in concentrations generally within the range of from about 0.001% by weight to about 25% by weight.

The invention includes novel solid compositions of matter wherein the active agent or agents are absorbed or adsorbed in or on a sorptive carrier, such as finely divided clay, talc, gypsum, lime, wood flour, fuller's earth, kieselguhr, or the like. The solid composition, or dust, may contain from as little as 1% by weight of active material to 50% by weight of active material, or even more. It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.5 to 30 or more pounds per acre. It will be appreciated that the rate of application is subject to variation according to the particular active agent used, the particular species of plants involved, and the local conditions, for example, temperature, humidity, moisture content of the soil, nature of the soil, and the like. Effective resolution of these factors is well within the skill of those well versed in the herbicide art.

The herbicidal compositions may contain the benzimidazole of the invention as the sole active agent, or they may contain in addition thereto other biologically active substances. Thus, insecticides, e.g., DDT, endrin, dieldrin, aldrin, chlordane, demeton, methoxychlor, DDVP, naled, Ciodrin® Insecticide and Bidrin® Insecticide, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditions or other plant regulators, such as napthaleneacetic acids, 2,4 - dichlorophenoxyacetic acid and the like, and/or herbicides of different properties.

I claim as my invention:
1. 2-methylthio-5,6-dichlorobenzimidazole.

References Cited

Nakajima et al.: Jour. Pharm. Soc. Japan, vol. 78, pages 1378–82 (1958).

WALTER A. MODANCE, *Primary Examiner.*

N. TROUSOF, *Assistant Examiner.*